(12) United States Patent
Batiz et al.

(10) Patent No.: US 10,574,980 B1
(45) Date of Patent: Feb. 25, 2020

(54) DETERMINATION OF METRICS DESCRIBING QUALITY OF VIDEO DATA BY EXTRACTING CHARACTERISTICS FROM THE VIDEO DATA WHEN COMMUNICATED FROM A VIDEO SOURCE TO A DISPLAY DEVICE

(71) Applicant: CASE ON IT, S.L., Madrid (ES)

(72) Inventors: Agustin Batiz, Madrid (ES); Diego Ruiz-Moreno, Madrid (ES); Arthur Filoche, Paris (FR); Rodolfo Boris Oporto, Madrid (ES); Cesar Corbacho, Madrid (ES); Jorge Soria, Madrid (ES)

(73) Assignee: CASE ON IT, S.L., Madrid (ES)

( * ) Notice: Subject to any disclaimer, the term of this patent is extended or adjusted under 35 U.S.C. 154(b) by 0 days.

(21) Appl. No.: 16/275,277

(22) Filed: Feb. 13, 2019

(51) Int. Cl.
*G06K 9/36* (2006.01)
*H04N 17/02* (2006.01)
*G06T 7/246* (2017.01)
*G06T 7/90* (2017.01)

(52) U.S. Cl.
CPC .............. *H04N 17/02* (2013.01); *G06T 7/248* (2017.01); *G06T 7/90* (2017.01); *G06T 2207/10016* (2013.01); *G06T 2207/10024* (2013.01); *G06T 2207/20056* (2013.01)

(58) Field of Classification Search
CPC .................................. G06K 9/36; G06K 9/46
USPC .......................................... 375/240.1–240.29
See application file for complete search history.

(56) References Cited

U.S. PATENT DOCUMENTS 7,733,380 B1 * 6/2010 Cote .................. H04N 5/23212
348/220.1

* cited by examiner

*Primary Examiner* — Anand S Rao
(74) *Attorney, Agent, or Firm* — Fenwick & West LLP (57) ABSTRACT

A video evaluation device is coupled to a video source, such as a set-top box, that obtains video data, and to a display device that presents video data received from the set-top box. Content received by the video source is communicated to the testing device, which communicates the video data to the display device for presentation to a user and generates a copy of the video data. The video evaluation device applies one or more computer vision methods and machine learned models to the copy of the video data to generate metrics identifying quality of the video data from characteristics extracted from the copy of the video data and likely user interaction with the video data. The video evaluation device testing device also communicates with an online system that combines metrics determined by the video evaluation device as well as data from other sources to identify video data quality.

22 Claims, 3 Drawing Sheets

DETERMINATION OF METRICS DESCRIBING QUALITY OF VIDEO DATA BY EXTRACTING CHARACTERISTICS FROM THE VIDEO DATA WHEN COMMUNICATED FROM A VIDEO SOURCE TO A DISPLAY DEVICE

BACKGROUND

This invention relates generally to evaluating quality of video data, and more particularly to determining performance of communication channels, and more particularly to evaluating effects of technical characteristics of a communication channel with user perception of the communication channel's performance.

An increasing number of applications involve video data. In particular, digital television broadcasts, video streaming applications, and real-time audio and video services consume an increasing amount of networking resources. Additionally, numbers of client devices retrieving and presenting data via a network have continued to increase, with an increasing amount of network usage by client devices used to obtain video data. However, when providing video data to client devices, the quality of the video data can be degraded during capturing, compression, transmission, reproduction, and displaying the video data, which impairs perception of the video data by various users.

While subjective experiments allow providers of video data to o assess user perception of video data through express user feedback regarding different video data presented to the user, such subjective experiments are time-consuming to implement. Accordingly, efforts have been made to develop objective quality metrics for video data to predict user perception of video data from characteristics of the video data itself. For example, quality metrics for video data may be determined by comparing the video data originally transmitted form a content provider to the video data displayed by a client device. However, determining objective metrics by comparing presented video data to the transmitted video data require decoding of the originally received video data to identify discrepancies between the transmitted video data and the displayed video data, involving significant integration with the content provider of the video data as well as obtaining access rights to decode the originally received video data.

SUMMARY

A video evaluation device is coupled to a video source that obtains video data, such as video data received from a content provider via a network. Additionally, the video evaluation device is coupled to a display device. The video evaluation device receives video data from the video source and generates a copy of the video data while transmitting the video data to the display device for presentation to a user. To allow evaluation of the video data, the video evaluation device determines one or more metrics from characteristics of the copy of the video data. Determining the one or more metrics from a copy of the video data allows the video evaluation device to determine the one or more metrics without delaying or impairing display of the video data by the display device.

In various embodiments, the video evaluation device determines various metrics from the copy of the video data. For example, the video evaluation device compares pixel values at corresponding locations in different frames to generate temporal information used to identify frozen frames in the video data and subsequently generates a metric identifying an amount (e.g., a number or a percentage) of frames of the copy of the video data that are frozen. As another example, the video evaluation device compares intensities of adjacent pixels in each frame of the copy of the video data to determine an amount of blockiness or pixilation in different frames of the copy of the video data and generates a metric identifying an amount (e.g., a number or a percentage) of frames of the copy of the video data having at least a threshold amount of blockiness or pixilation. In another example, the video evaluation device extracts multiple color matrices from each frame of the copy of the video data, as well as color histograms from a specific percentage of pixels sampled from each frame of the copy of the video data, and determines whether a frame of the copy of the video data has at least a threshold amount of chromatic aberration based on linear regression analysis of each pair of color matrices extracted from the frame of the copy of the video data and of each pair of color matrices extracted from the pixels sampled from the frame; the video evaluation device generates a metric identifying an amount (e.g., a percentage or a number) of frames of the copy of the video data including the threshold amount of chromatic aberration. Additionally, the video evaluation device may generate a metric identifying an amount of the copy of the video data in which one or more gaps are identified in audio data included in the copy of the video data. When generating the metrics, such as those described above, the video evaluation device does not access the original video data obtained by the video source to compare the originally obtained video data to the video data received by the video evaluation device, but instead extracts different characteristics from the video data received by the video evaluation device itself. Hence, rather than identity discrepancies between the video data obtained by the video source and the video data received by the video evaluation device, the video evaluation device uses information extracted from the rom the video data received by the video evaluation device to generate metrics describing quality of the video data, allowing the video evaluation device to generate the metrics describing the quality of the video data without decoding the video data, enabling the video evaluation device to more easily generate metrics for video data obtained by the video source from a variety of content providers.

The video evaluation device transmits the generated metrics to an online system via a network. The online system aggregates the generated metrics along with metrics generated by other video evaluation devices and other information, such as information from a content provider system. For example, the online system generates one or more statistical measures for video data based on metrics received from different video evaluation devices. Additionally, the online system may apply a trained model to the metrics from the video evaluation device or to the aggregated metrics to generate a value for a performance metric identifying user perception of the video data based on the metrics from the video evaluation device or from aggregated metrics from video evaluation devices. Additionally, the video evaluation device exchanges characteristics of received video data and generated metrics with one or more other video evaluation devices, allowing the video evaluation device to identify other video evaluation devices presenting video data having one or more common characteristics or to identify other video evaluation devices that have determined one or more metrics for video data within a threshold amount of corresponding metrics determined by the video evaluation device.

Hence, the video evaluation device generates one or more metrics describing characteristics of video data from the video source without accessing the video data originally provided to the video source. Additionally, the metrics generated by the video evaluation device are generated without the video evaluation device decoding the received video data and without delaying communication of the video data to the display device for presentation. This allows the video evaluation device to generate metrics for a broad range of types of video data without impairing presentation of the video data to the user. Leveraging the metrics generated by the video evaluation device allows the online system to provide a prediction or an estimation of user perception of the video data from the video source without explicitly requesting assessment of a user viewing the video data via the display device. This allows the video evaluation device and online system to automatically and objectively provide an indication of user perception of the video data to a content provider based on the metrics generated from the video data itself by the video evaluation device.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
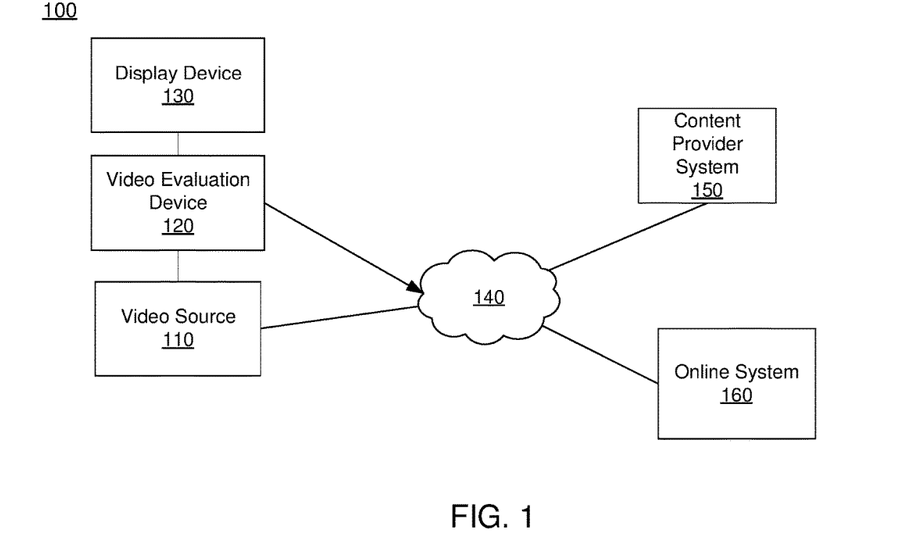
FIG. 1 is a block diagram of a system environment in which a video evaluation device generates metrics describing quality of video data received by a video source, in accordance with an embodiment of the invention.

FIG. 1 is a block diagram of one embodiment of a system environment 100 in which a video evaluation device 120 generates metrics describing quality of video data received by a video source 110. The system environment 100 shown by FIG. 1 comprises a video source 110, a video evaluation device 120, a display device 130, a network 140, a content provider system 150, and an online system 160. In alternative configurations, different and/or additional components may be included in the system environment 100.

The video source 110 outputs video data for presentation via the display device 130. In some embodiments, the video source 110 receives video data from the content provider system 150 via the network 140. For example, the video source 110 is a set top box receiving video data from the content provider system 150 via the network 140. Alternatively, the video source 110 is a digital video recorder, a digital video disc player, a personal computer, or any other device capable of accessing video data included on a storage device. The video source 110 uses one or more specific interfaces to communicate video data to the display device 130 for presentation. An interface used by the video source 110 to communicate video data to the display device 130 defines a format of video data and audio data communicated via the interface. In some embodiments, the interface specifies one or more resolutions of video data communicated from the video source 110 to the display device 130. For example, the video source 110 communicates video data to the display device 130 using the high-definition multimedia interface (HDMI) audio/video interface. In some embodiments, the video source 110 is capable of communicating video data through different interfaces.

The video evaluation device 120 is coupled to the video source 110 and to the display device 130 and receives video data from the video source 110. By analyzing the video data, the video evaluation device 120 determines one or more metrics describing quality of the video data. To determine the one or more metrics without delaying or impairing subsequent presentation of the video data by the display device, the video evaluation device 120 splits the video data between an output bus and an evaluation bus. The output bus is coupled to the display device 130 and communicates the video data to the display device 130, while the evaluation bus communicates the video data to one or more evaluation modules, which are further described below in conjunction with FIG. 2. In various embodiments different evaluation modules generate different metrics based on characteristics of the video data. For example, an evaluation module determines temporal information between consecutive frames of video data in the evaluation bus to determine a measure of frozen frames in the video data. Another evaluation module determines a measure of blockiness of different frames of the video data in the evaluation bus based on differences between adjacent pixels in a frame of the video data in the evaluation bus. In some embodiments, another evaluation module determines a measure of chromatic aberration within various frames of the video data in the evaluation bus by determining a plurality of color matrices (e.g., a red matrix, a blue matrix, and a green matrix) for different frames of the video data in the evaluation bus. In various embodiments, the video evaluation device any includes different numbers of evaluation modules that generate different measures of quality of the video data based on characteristics of the video data in the evaluation bus. The video evaluation device 120 is further described below in conjunction with FIG. 2.

To generate the one or metrics describing quality of the video data, the video evaluation device 120 does not access the original video data obtained by the video source 110 to compare the originally obtained video data to the video data received by the video evaluation device 120, but extracts different characteristics from the video data received by the video evaluation device 120. Hence, rather than identity discrepancies between the video data obtained by the video source 110 to the video data received by the video evaluation device 120, the video evaluation device 120 extracts information from the video data received by the video evaluation device and generates metrics describing the quality of the video data form the extracted information. This allows the video evaluation device 120 to generate the metrics describing the quality of the video data without decoding the video data, enabling the video evaluation device 120 to generate metrics for video data obtained by the video source 110 from a variety of content providing systems 150.

Additionally, the video evaluation device 120 is coupled to the network 140 and transmits one or more metrics generated by the video evaluation device 120 to the online system 160 via the network. In some embodiments, the video evaluation device 120 transmits the one or more generated metrics to the online system 160 a periodic time interval. Alternatively, the video evaluation device 120 transmits the one or more generated metrics to the online system 160 within a threshold amount of time after generating the one or more metrics.

The display device 130 receives video data from the video source 110 via the video evaluation device 120 and displays the video data. Example display devices 130 include a television, a monitor, a tablet computer, a laptop computer, a desktop computer, or any other suitable device configured to display video data.

The video source 110, the video evaluation device 120, the content provider system 150, and the online system 140 are configured to communicate via the network 140, which may comprise any combination of local area and/or wide area networks, using both wired and/or wireless communication systems. In one embodiment, the network 140 uses standard communications technologies and/or protocols. For example, the network 120 includes communication channels using technologies such as Ethernet, 802.11, worldwide interoperability for microwave access (WiMAX), 3G, 4G, 5G, code division multiple access (CDMA), digital subscriber line (DSL), etc. In some embodiments, the network 140 includes a single type of communication channel, while in other embodiments the network 140 includes multiple types of communication channels. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication channels of the network 140 may be encrypted using any suitable technique or techniques.

One or more content provider systems 150 may be coupled to the network 140 and transmit video data or other content to the video source 110 via the network 140. For example, a content provider system 150 is a television provide communicating video data to the video source 110 to communicate to the display device 130 for presentation. As another example, a content provider system 150 is a server from which the video source 110 obtains video data. However, a content provider system 150 may be any system providing video data for presentation by the video source 110 via the display device 130. Additionally, one or more content provider systems 150 may provide text or image content in addition to or in place of video data. For example, a content provider system 150 is a social networking system or an e-commerce system. Hence, content provider systems 150 may provide content other than video data via the network 140.

The online system 160 receives metrics describing video data from one or more video evaluation devices 120 and combines metrics received from different evaluation devices 120 corresponding to common video data received by the different video evaluation devices 120 from different video sources 110. Additionally, the online system 160 may argument metrics received from different video evaluation devices 120 with additional information. In various embodiments, the online system 160 obtains information from one or more content provider systems 150 corresponding to video data identified along with one or more metrics by one or more video evaluation devices 120. For example, a video evaluation device 120 extracts a content identifier from frames of video data (e.g., hashtags, network addresses), identifies a content provider system 150 associated with an extracted content identifier, and obtains usage information associated with the extracted content identifier by the content provider system 150 during times corresponding to times when the video evaluation devices 120 received the video data from which the content identifier was extracted. In an example, the video evaluation device 120 extracts a hashtag from video data and identifies the hashtag to the online system 160 along with one or more metrics describing the video data, as further described below in conjunction with FIG. 2, as well as times when the one or more metrics were generated by the video evaluation device 120; the online system 160 obtains a number of posts or comments including the hashtag (or other content identifying the hashtag) received by one or more content provider systems 150 during a range of times including the times when the one or more metrics were generated by the video evaluation device 120. Subsequently, the online system 160 augments the one or more metrics for the video data from the video evaluation device 120 with the number of posts or comments including the hashtag obtained from one or more content provider systems 150.

The online system 160 may also receive one or more metrics describing video data from multiple video evaluation devices 120, with each metric associated with a type of video data for which the metric was generated, as further described below in conjunction with FIG. 2; and aggregate metrics for different types of content based on metrics received from different video evaluation devices 120 and associated with a common type of video data. For example, the online system 160 determines a mean, a median, and a mode of one or more metrics associated with a specific type of video data and associated with a specific time range; in other examples, the online system 160 determines any suitable statistical measure (e.g., a variance, a standard deviation, etc.) of each of one or more metrics associated with the specific type of video data and associated with the specific time range. Additionally, the online system 160 aggregates metrics that are received from different video evaluation devices 120 and that were generated for video data having one or more common characteristics. Example common characteristics for the video data include a channel that provided the video data, a type of video source providing the video data to the video evaluation device 120, a content provider system 150 providing the video data to video sources 110, a type of communication channel from which the video source 110 received the video data from a content provider system 150. In some embodiments, the online system 160 analyzes the aggregated metrics for video data having one or more common characteristics, as well as the characteristics of the video data, and identifies one or more potential causes for aggregated metrics that do not satisfy one or more criteria, which may be specified by a content providing system 150 or by the online system 160. For example, the online system 160 transmits a message to a content providing system 150 indicating a potential problem with the network 140 or with a communication channel from the content provider system 150 to the network in response to the online system 160 determining aggregated received metrics for video data from the content providing system 150 and associated with different channels do not satisfy one or more criteria. Alternatively, the online system 160 transmits a message to a content providing system 150 indicating a potential problem with encoding or transmission of a specific channel in response to the online system 160 determining aggregated received metrics for video data from the content providing system 150 and associated with the specific channel do not satisfy one or more criteria, while aggregated retrieved metrics for video data from the content providing system 150 and associated with other channels satisfy the one or more criteria.

Figure 2:
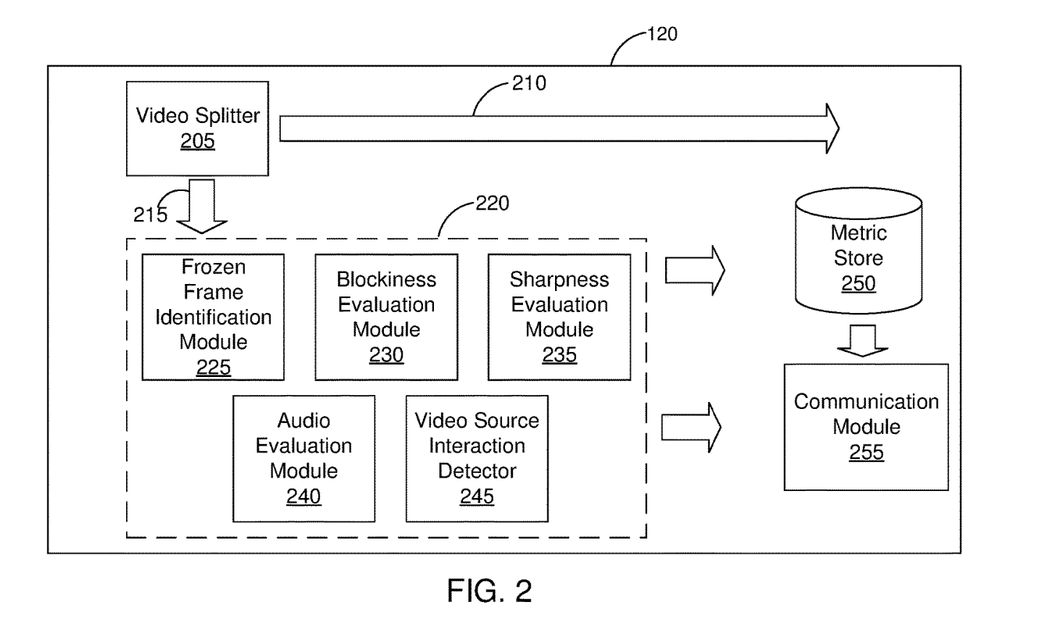
FIG. 2 is a block diagram of an architecture of a video evaluation device, in accordance with an embodiment of the invention.

FIG. 2 is one embodiment of an architecture of a video evaluation device 120. The video evaluation device 120 shown in FIG. 2 includes a video splitter 205 coupled to an output bus 205 and to an evaluation bus 210. Additionally, one or more evaluation modules 220 are coupled to the evaluation bus 210, and the video evaluation device 120 includes a metric store 250 and a communication module 260. In the example of FIG. 2, the evaluation modules 220 include a frozen frame identification module 225, a blockiness evaluation module 230, a sharpness evaluation module, an audio evaluation module 240, and a video source interaction detector 245; however, in other embodiments, the one or more evaluation modules 220 include additional, alternative, or fewer components than those shown in FIG. 2. In other embodiments, the video evaluation device 120 may include additional, fewer, or different components for various applications. Conventional components such as network interfaces, security functions, load balancers, failover servers, management and network operations consoles, processor, and the like are not shown so as to not obscure the details of the system architecture.

The video splitter 205 receives video data from a video source 110 and splits the video data for communication to the output bus 210 and to the evaluation bus 215. In various embodiments, the video splitter 205 replicates the video data received from the video source 110 and transmits a copy of the video data to the evaluation bus 215, while transmitting the originally received video data to the output bus 210, which is any suitable communication channel capable of transmitting video data. However, in other embodiments, the video splitter 205 splits the video data divides in the video data in any suitable manner so the received video data is transmitted to the output bus 210, while a copy of the video data is transmitted to the evaluation bus 215, which is any suitable communication channel capable of transmitting video data.

The output bus 210 is configured to be coupled to the display device 130, which is further described above in conjunction with FIG. 1. Hence, the output bus 210 transmits video data received by the video evaluation device 120 to the display device 130. The evaluation bus 215 is configured to transmit a copy of the received video data received by the video evaluation device 120 from the video splitter 205 to one or more evaluation modules 220. Accordingly, the video splitter 205 allows the video evaluation device 120 to transmit the video data from the video source 110 to the display device 130 without interruption, while generating one or more metrics describing quality of the video data by extracting information from the copy of the video data, as further described below.

One or more evaluation modules 220 include instructions that, when executed by one or more processors included in the video evaluation device 120, cause one or more processors in the video evaluation device 120 to extract one or more metrics from the copy of the video data provided to the evaluation bus by the video splitter 205. For purposes of illustration, FIG. 2 shows different evaluation modules 220 corresponding to different metrics—the frozen frame identification module 225, the blockiness evaluation module 230, the sharpness evaluation module 235, the audio evaluation module 240, and the video source interaction detector 245. However, in various embodiments, the video evaluation device 120 includes different or additional evaluation modules 220. Additionally, in some embodiments, the functionality described below regarding different evaluation modules 220 is combined, so a single module provides the functionality described below in conjunction with multiple evaluation modules 220. In various embodiments, different evaluation modules 220 generate measures or metrics from the copy of the video data in parallel, allowing the video evaluation device 120 to more efficiently determine multiple measures or metrics describing the copy of the video data. In some embodiments, the evaluation modules 220 are implemented as one of more field programmable gate arrays configured to provide the functionality described below.

The frozen frame identification module 225 determines temporal information between consecutive frames of the copy of the video data communicated to the evaluation bus. In various embodiments, the frozen frame identification module 225 generates a measure of temporal information between consecutive frames of the copy of the video data by comparing pixels at each location within a frame of the copy of the video data to pixels at corresponding locations within a temporally consecutive frame of the copy of the video data. For example, the frozen frame identification module 225 applies a logical operator to each pixel at corresponding locations in a frame of the copy of the video data and in a consecutive frame of the copy of the video data that returns a logical value of "0" when a value of a pixel at a location in the frame of the copy of the video data is the same as a value of the pixel in the corresponding location in the subsequent frame of the video data (e.g., a XOR operation) and sums the results from application of the logical operator pixels at each location of the frame and in the consecutive frame. In some embodiments, the frozen frame identification module 225 scales the sum in the preceding example by an inverse of a total number of pixels in a frame of the copy of the video data. For example, $$TI_1(t) = \frac{1}{(W)(H)} \sum_{i=0}^{W-1} \sum_{j=0}^{H-1} B(i, j, t) XORB(i, j, t-1) \qquad (1)$$

In equation 1 above, W is the width of a frame of the copy of the video data and H is the height of the width of the frame of the copy of the video data. Further, in equation (1) above, i denotes a horizontal location of a pixel in frames of the copy of the video data, while j denotes a vertical position of a pixel in frames of the copy of the video data and XOR is a logical operation with a value of "0" when both inputs are equal and a value of "1" when the inputs are unequal. If the measure of temporal information described above less than a threshold value, the frozen frame identification module 225 determines that consecutive frames are candidate frozen frames.

To more accurately identify frozen frames, when the frozen frame identification module 225 determines that consecutive frames are candidate frozen frames, or determines that at least a threshold number of consecutive frames are candidate frozen frames, the frozen frame identification module 225 determines additional temporal information for the consecutive frames identified as candidate frozen frames. In various embodiments, the frozen frame identification module 225 identifies a frame from the copy of the video data identified as a candidate frozen frame and identifies an initial frame from the consecutive frames identified as candidate frozen frames. The frozen frame identification module 225 determines the additional temporal information for a frame identified as a candidate frozen frame as follows:

$$TI_2(t) = \frac{1}{(W)(H)} \sum_{i=0}^{W-1} \sum_{j=0}^{H-1} B(i, j, t) XORB(i, j, t-t') \quad (2)$$

Where, TI2 is the additional temporal information, W is the width of a frame of the copy of the video data, and H is the height of the frame of the copy of the video data. Additionally, t is the temporal index of the frame of the copy of the video data identified as a candidate frozen frame, while t-t' is the temporal index of the initial frame of consecutive frames of the copy of the video data identified as candidate frozen frames. Further, in equation (2) above, i denotes a horizontal location of a pixel in frames of the copy of the video data, while j denotes a vertical position of a pixel in frames of the copy of the video data and XOR is a logical operation with a value of "0" when both inputs are equal and a value of "1" when the inputs are unequal. If the additional temporal information for the frame identified as a candidate frozen frame is less than an additional threshold value, the frozen frame identification module 225 identifies the candidate frozen frame as a frozen frame. In some embodiments, the additional threshold value equals the threshold value used to identify a frame as a candidate frozen frame; however, in other embodiments, the additional threshold value differs from the threshold value. Using the additional temporal information for candidate frozen frames to identify frozen frames reduces a likelihood of the frozen frame identification module 225 identifying frames of the copy of the video data with low motion content from being erroneously identified as frozen frames. To further improve accuracy, the frozen frame identification module 225 sets the temporal information for a frame equal to zero if the temporal information for the frame (e.g., determined from equation (1) above) is less than a minimum value and sets the additional temporal information for a candidate frozen frame to zero if the additional temporal information (e.g., determined from equation (2) above) for the candidate frozen frame is less than the minimum value. The preceding mitigates low levels of noise in frames of the copy of the video data being identified as motion. In some embodiments, the frozen frame identification module 225 determines a metric identifying a number of frozen frames in the copy of the video data, identifying a percentage of frames in the copy of the video data that are frozen frames, identifying a duration that the copy of the video data includes frozen frames, identifying times within the copy of the video data where frames are frozen, identifying frames of the copy of the video data that are frozen, or identifying any other suitable information.

Figure 3:
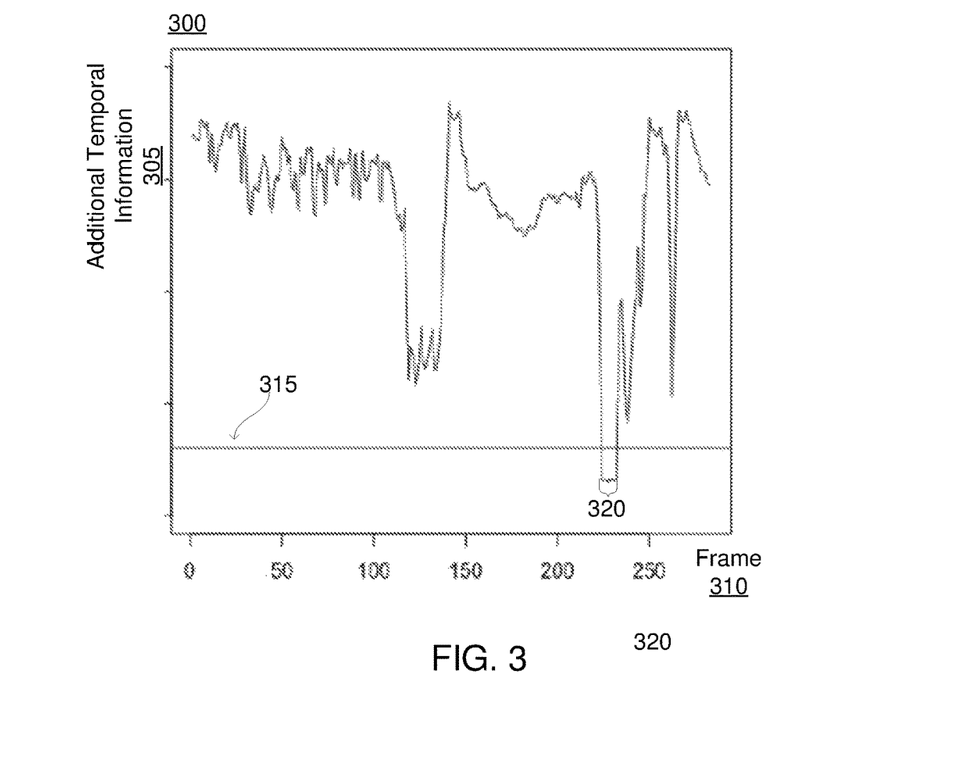
FIG. 3 is an example plot showing identification of frozen frames of video data, in accordance with an embodiment.

FIG. 3 shows an example identification of frozen frames of video data by the frozen frame identification module 225. In FIG. 3, a plot 300 of additional temporal information 305 determined for different frames of a copy of video data, as further described above, against an index 310 identifying different frames of the copy of the video data is shown. Hence, the plot 300 shown of FIG. 3 shows different values for the additional temporal information 305 against an index 310 identifying many a frame within the copy of the video data for which the additional temporal information 305 was determined. FIG. 3 also depicts the additional threshold value 315, further described above, to which the additional temporal information is compared to identify frozen frames in the copy of the video data. In the example of FIG. 3, a set 320 of frames have additional temporal information below the additional threshold value 315, causing the frozen frame identification module 225 to identify the set 320 of frames in a metric identifying frozen frames in the copy of the video data.

Referring back to FIG. 2, the blockiness evaluation module 230 determines absolute differences between intensities (or colors) of horizontally adjacent pixels in each fame of the copy of the video data, resulting in a gradient image for each frame of the copy of the video data. In various embodiments, the blockiness evaluation module 230 normalizes each element of the gradient image for each frame of the copy of the video data. The normalized gradient image corresponding to each frame of the copy of the video data is averaged to determine a one dimensional array representing a horizontal profile of each normalized gradient image; for example, the horizontal profile of a normalized gradient image includes elements corresponding to each column of the normalized gradient image, with a value of an element determined as a sum of normalized values within a column divided by a total number of pixels in the column. The blockiness evaluation module 230 then applies a discrete Fourier transform to the horizontal profile of each normalized gradient image and determines a horizontal blockiness measure for each normalized gradient image (corresponding to each frame of the copy of the video data) from the magnitudes of the discrete Fourier transform coefficients. For example, the horizontal blockiness measure for a frame of the copy of the video data is a sum of the magnitudes of the discrete Fourier transform coefficients for the normalized gradient image corresponding toe the frame of the copy of the video data.

Additionally, the blockiness evaluation module 230 determines an additional one dimensional array representing a vertical profile of each normalized gradient image. For example, the vertical profile of a normalized gradient image includes elements corresponding to each row of the normalized gradient image, with a value of an element determined as a sum of normalized values within a row divided by a total number of pixels in the row. The blockiness evaluation module 230 then applies a discrete Fourier transform to the vertical profile of each normalized gradient image and determines a vertical blockiness measure for each normalized gradient image (corresponding to each frame of the copy of the video data) from the magnitudes of the discrete Fourier transform coefficients. For example, the vertical blockiness measure for a frame of the copy of the video data is a sum of the magnitudes of the discrete Fourier transform coefficients for the normalized gradient image corresponding toe the frame of the copy of the video data.

From the horizontal blockiness measure and the vertical blockiness measure for frames of the copy of the video data, the blockiness evaluation module 230 determines a blockiness measure for each frame of the copy of the video data. In various embodiments, the blockiness evaluation module 230 determines the blockiness measure for a frame of the copy of the video data as:

$$BM = \sqrt{r(BM_V^2) + (1-r)BM_H^2} \quad (3)$$

Where $BM_V$ is the vertical blockiness measure of the frame of the copy of the video data, $BM_H$ is the horizontal blockiness measure of the frame of the copy of the video data, and r is a weight determined via a training process. The blockiness evaluation module 230 identifies frames of the copy of the video data having at least a threshold blockiness measure. In some embodiments, the blockiness evaluation module 230 generates one or more metrics identifying a number of frames of the copy of the video data having at least the threshold blockiness measure, identifying a percentage of frames of the copy of the video data having at least the threshold blockiness measure, identifying a duration that the copy of the video data includes frames having at least the threshold blockiness measure, identifying times within the copy of the video data corresponding to frames of the copy of the video data having at least the threshold blockiness measure, identifying frames of the copy of the video data having at least the threshold blockiness measure, or identifying any other suitable information.

Figure 4:
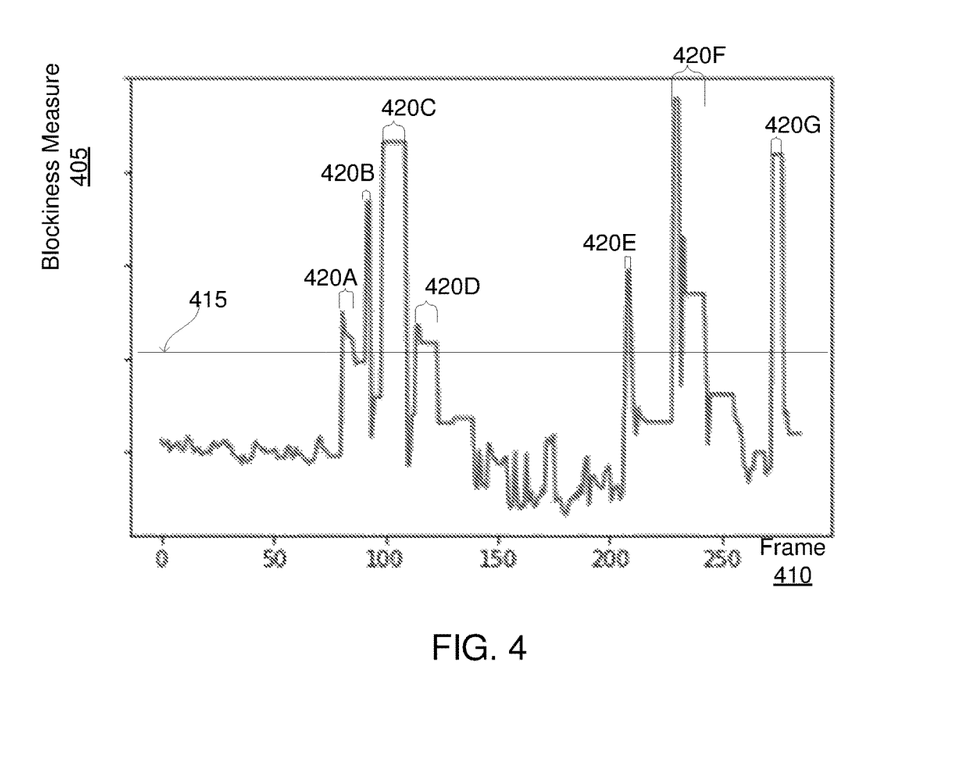
FIG. 4 is an example identification of frames within video data having at least a threshold blockiness measure, in accordance with an embodiment.

FIG. 4 shows an example identification of frames within a copy of video data that have at least a threshold blockiness measure by the blockiness evaluation module 230. In FIG. 4, a plot 400 of blockiness measures 405 determined for different frames of a copy of video data, as further described above, against an index 410 identifying different frames of the copy of the video data is shown. Hence, the plot 400 shown of FIG. 4 shows different values for the blockiness measure 405 determined for different frames of the copy of the video data against an index 410 identifying a number of a frame within the copy of the video data for which a blockiness measure 405 was determined. FIG. 4 also depicts a threshold blockiness measure 415. Frames with blockiness measures greater than the threshold blockiness measure 415 are identified by the blockiness evaluation module 230 to identify frames with amounts of blockiness, or pixilation, likely to be perceptible to users viewing the copy of the video data, So the blockiness evaluation module 230 generates a metric identifying the frames having blockiness measures above the threshold blockiness measure 415. In the example of FIG. 4, sets 420A, 420B, 420C, 420D, 420E, 420F, 420G of frames have blockiness measures greater than the threshold blockiness, so the blockiness evaluation module 230 identifies sets 420A, 420B, 420C, 420D, 420E, 420F, 420G of frames in a generated metric.

Referring back to FIG. 2, the sharpness evaluation module 235 determines whether frames of the copy of the video data have chromatic aberration. In various embodiments, for each frame of the copy of the video data, the sharpness evaluation module 235 extracts a plurality of color matrices or histograms. For example, the sharpness evaluation module 235 extracts a matrix of red color values for each pixel of a frame of the copy of the video data, a matrix of green color values for each pixel of the frame of the copy of the video data, and a copy of blue color values for each pixel of the frame of the copy of the video data. The sharpness evaluation module 235 performs linear regression analysis between each pair of color matrices extracted from each frame of the copy of the video data and determines a correlation coefficient for each regression performed. Additionally, the sharpness evaluation module samples a specific percentage (e.g., 10%) of pixels in each frame of the copy of the video data in a horizontal and a vertical direction of the frames. For each frame, the sharpness determination module 235 extracts a plurality of color matrices or histograms from the sampled pixels, performs linear regression analysis between each pair of color matrices extracted from the sampled pixels of the frame of the copy of the video data and determines a correlation coefficient for each regression performed. The sharpness determination module 235 identifies a frame of the copy of the video data as having chromatic aberration in response to the correlation coefficients for the regressions between pairs of color matrices for the frame satisfying one or more criteria and in response to the correlation coefficients for the regressions for regressions between pairs of color matrices for the sampled pixels of the frame satisfying one or more additional criteria. The sharpness evaluation module 235 generates one or more metrics identifying a number of frames of the copy of the video data identified as having chromatic aberration, identifying a percentage of frames of the copy of the video data identified as having chromatic aberration, identifying a duration that the copy of the video data includes frames identified as having chromatic aberration, identifying times within the copy of the video data were identified as having chromatic aberration, identifying frames of the copy of the video data identified as having chromatic aberration, or identifying any other suitable information.

The audio evaluation module 240 identifies temporal locations in the copy of the video data including pauses or gaps in audio included in the copy of the video data. To identify frames including pauses or gaps in audio included in the copy of the video data, the audio evaluation module 240 filters audio data in the copy of the video data using an envelope follower and compares the filtered audio data to one or more threshold values to exclude values outside of a range, resulting in a vector of values. The audio evaluation module 240 applies an averaging filter to the vector and compares the averaged vector to one or more threshold values to exclude values outside of the range.

Audio data within a threshold duration of a start time and of and end time of the copy of the video data is discarded by the audio evaluation module 240, which compares the averaged vector of values to a minimum value. The audio evaluation module 240 identifies portions of the averaged vector having values less than the minimum value and determines a cumulative power of a specific number of values of the averaged vigor prior to an identified portion of the average vector. In response to the cumulative power of the specific number of values of the averaged rector prior to an identified portion of the average vector (corresponding to a portion of the copy of the video data a specific amount of time prior to a time of the portion of the copy of the video data corresponding to the identified portion of the average vector) being less than a threshold power, the audio evaluation module 240 identifies a portion of the copy of the video data corresponding to an identified portion of the averaged vector as including a gap in the audio data. Accounting for the power of portions of the audio data the specific amount of time prior to the time of the portion of the copy of the video data corresponding to the identified portion of the average vector allows the audio evaluation module 240 to more accurately identify gaps in the audio data by accounting for an abrupt pause of the audio data, which is more likely to indicate an error with the audio data than a gradual decrease in power prior to the time of the portion of the copy of the video data corresponding to the identified portion of the average vector. In various embodiments, the audio evaluation module 240 generates one or more metrics identifying times within the copy of the video data where a gap in the included audio data was identified, identifying a percentage of the copy of the video data in which a gap in the included audio data was identified, identifying frames within the copy of the video data in which a gap in the included audio data was identified, or any other suitable metric identifying portions of the copy of the video data in which a gap in the included audio data was identified.

The video source interaction detector 245 extracts interactions with the video source 110 by a user from information received from the video source 110. In various embodiments, the video source interaction detector 245 applies one or more machine learning models to the copy of the video data to determine performance of one or more functionalities offered by a content provider system 150 from which the video source 110 received the video data. If the video source 110 receives the video data from a television provider, application of the one or more machine learning models to the copy of the video data identifies one or more interactions with the video data received by the video source 110 based on content included in the copy of the video data. For example, based on characteristics of the video data, the video source interaction detector 245 identifies an interaction with the video source 110 to change a channel from which the video source 110 presents video data, identifies an interaction to view a program guide via the video source 110, identifies an instruction to modify presentation of the video data by the video source 110 (e.g., a fast forward instruction, a pause instruction, a rewind instruction), an interaction with the video source 110 requesting on-demand video content, or other suitable interactions with the video source 110. Example interactions with the video source 110 include opening a menu, navigating through the menu, pausing video data, rewinding video data, fast forwarding video data, requesting alternative video content (e.g., changing a channel of the video source 110), providing payment information for video data, or any other suitable interaction. The video evaluation device 120 receives the interactions along with the video data from the video source 110, where the video splitter 205 generates a copy of the interactions that is communicated to the evaluation bus 215. The video source interaction detector 245 identifies an interaction and subsequently identifies when the interaction was completed or when another interaction was received. For example, in response to receiving an interaction to present a menu, the video source interaction detector 245 determines an amount of time until the menu is subsequently presented. As another example, in response to receiving an interaction to navigate through a menu, the video source interaction detector 245 determines an amount of time until another menu or until another portion of the menu is presented. Hence, in various embodiments, the video source interaction detector 245 determines an amount of time between identifying an interaction and a change in the copy of the video data after identifying the interaction. Hence, application of the one or more machine learning models by the video source interaction detector 245 to identify different functionality the video source 110 is requested to perform based on content of the copy of the video data, and to determine the status of the video source 110 performing the requested functionality (e.g., loading of video data, partial location or partial changing of the video data) from the content of the video data. By determining statuses of different requested functionality at different times, the video source interaction detector 245 provides information describing time for different requested functionality to be completed, which may be correlated with metrics, such as those further described above, by the video evaluation device 120 to provide a content provider system 150 with information describing potential relationships between functionality provided by the video source 110 with other metrics.

In some embodiments, the video source interaction detector 245 applies one or more additional machine learning models that extract features from the copy of the video data. For example, the one or more additional machine learning models extract channel logos from the copy of the video data, extract a type of content corresponding to the copy of the video data (e.g., sports, news, advertising, etc.), content included in multiple frames of the copy of the video data (e.g., hashtags), or other information. Additionally, the video source interaction detector 245 extracts information received in conjunction with the video data, such as metadata in the copy of the video data identifying a name of the video data, a rating of the video data, a theme of the video data, etc. From the extracted features, the video interaction detector 245 generates one or more metrics based on different features. The video interaction detector 245 associates the different features with different times when the features were extracted and generates one or more metrics based on the extracted features and their associated times. For example, the video interaction detector 245 generates one or more metrics identifying an amount of time that video data from a specific channel is received by the video evaluation device 120, an amount of time that the video evaluation device 120 receives video data having a specific type, etc. The video source interaction detector 245 may subsequently aggregate metrics to provide metrics describing different features of the video data (e.g., metrics for different channels, metrics for different types of video data etc.). Hence, the video source interaction detector 245 may generate metrics describing actual use of the video source 110 by a user and subsequently correlate the metrics describing use of the video source 110 with other metrics, such as those further described above, by the video evaluation device 120 to provide a content provider system 150 with information describing effects of various metrics on usage of the video source 110 by the user.

The metric store 250 stores metrics generated by the one or more evaluation modules 220. In various embodiments, the metric store 250 stores times when different metrics were generated in association with the generated metrics and with an identifier of the copy of the video data. Additionally, the metric store associates a type with the copy of the video data from the video source interaction detector 245 (e.g., a channel corresponding to the copy of the video data, a description of the subject matter of the copy of the video data, etc.). In various embodiments, the metric store 250 is a persistent storage device, while in other embodiments the metric store is a non-persistent storage device. The metric story 250 may be a combination of a persistent storage device and a non-persistent storage device in some embodiments. Additionally, the metric store 250 may store the generated metrics for a specific amount of time before removing the generated metrics in some embodiments; alternatively, the metric store 250 stores the generated metrics until receiving an instruction to remove the generated metrics.

The communication module 255 couples the video evaluation device 120 to one or more other video evaluation devices 120 and to the online system 160 via the network 140. The communication module 255 retrieves metrics from the metric store 250 or from one or more evaluation modules 220 and communicates the metrics to the online system 140 or to one or more other video evaluation devices 120. The communication module 255 enables transmission of the one or more metrics via any suitable communication channel (e.g., Ethernet, 802.11, WiMAX, 3G, 4G, 5G, CDMA, etc.) or combination of communication channels. Any suitable networking protocol or combination of networking protocols (e.g., MPLS, TCP/IP, HTTP, SMTP, FTP, etc.) may be used by the communication module to transmits and to receive data via the network 140. Data transmitted or received by the communication module 255 may be represented using any suitable format, such as HTML or XML, in various embodiments.

Figure 5:
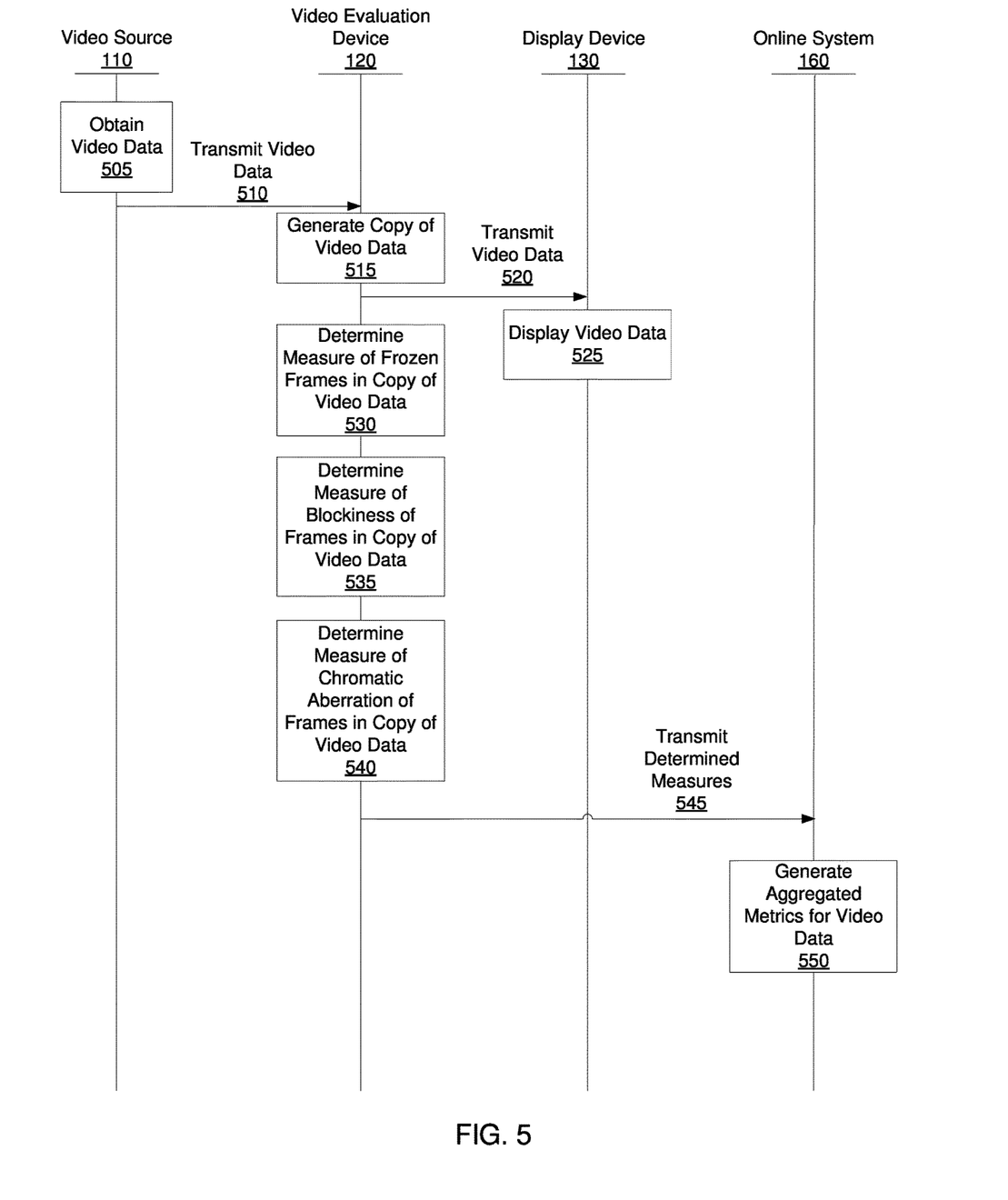
FIG. 5 is an interaction diagram of a method for generating metrics describing quality of video data presented by a display device receiving the video data from a video source, in accordance with an embodiment.

FIG. 5 is an interaction diagram of one embodiment of a method for generating metrics describing quality of video data presented by a display device 130 receiving the video data from a video source 110. In other embodiments, the method described in conjunction with FIG. 5 performs the steps described in conjunction with FIG. 5 in different orders than the order described in conjunction with FIG. 5. Further, various embodiments of the method may include different or additional steps than those described in conjunction with FIG. 5.

The video source 110 obtains 505 video data and transmits the video data to a video evaluation device 120 coupled to the video source 110 and to the display device 130. For example, the video source 110 receives the video data from a content provider system 150, such as a television provider, via a network 140. As another example, the content provider system 150 is a server transmitting video data (e.g., streaming video data, video data included in a web page) to the video source 110 via the network 140. Alternatively, the video source 110 retrieves video data from a storage device (e.g., a digital video disc, a hard drive, a solid state storage device, etc.).

The video source 110 transmits 510 the video data to the video evaluation device 120 coupled to the video source 110. For example, the video evaluation device 120 has a wired connection to the video source 110 through which the video source 110 transmits 510 the video data to the video evaluation device 120. As another example, the video evaluation device 120 is wirelessly coupled to the video source 110, and the video evaluation device 120 transmits 510 the video data to the video evaluation device 120 via the wireless connection. When the video evaluation device 120 receives the video data, the video evaluation device 120 generates 515 a copy of the video data and transmits 520 the video data received from the video source 110 to the display device 130, which displays 525 the video data. Hence, as further described above in conjunction with FIG. 2, the video evaluation device 120 splits the video data by generating the 515 copy of the video data while transmitting 520 the video data from the video source 110 to the display device 130.

Generating the copy of the video data allows the display device 130 to display the video data 525, while the video evaluation device 120 analyzes the copy of the video data. This allows the video evaluation device 120 to use the copy of the video data to analyze the video data without delaying display of the video data by the display device 130. Hence, the video evaluation device 120 allows determination of metrics describing quality of the video data without affecting display 525 of the video data by the display device 130.

To evaluate quality of the video data, the video evaluation device 120 determines 530 a measure of frozen frames in the copy of the video data, as further described above in conjunction with FIGS. 2 and 3. In various embodiments, the measure of frozen frames determined 530 by the video evaluation device 120 is a metric identifying a number or a percentage of frames in the copy of the video data that are frozen. The video evaluation device 120 determines 530 multiple metrics identifying frozen frames within the copy of the video data in some embodiments.

Additionally, the video evaluation device 120 determines 535 a measure of blockiness of frames in the copy of the video data, as further described above in conjunction with FIGS. 2 and 4. In various embodiments, the measure of blockiness of frames in the copy of the video data identifies a number of frames in the copy of the video data having at least a threshold amount of blockiness or pixilation, as further described above in conjunction with FIGS. 2 and 4. For example, the video evaluation device 120 determines 535 one or more metrics identifying a number or a percentage of frames within the copy of the video data that include at least a threshold amount of blockiness. The video evaluation device 120 determines 535 multiple metrics identifying frames within the copy of the video data having at least a threshold amount of blockiness in some embodiments.

Further, the video evaluation device 120 determines 540 a measure of chromatic aberration of frames in the copy of the video data, as further described above in conjunction with FIG. 2. In various embodiments, the measure of chromatic aberration of frames of the copy of the video determined 540 by the video evaluation device 120 is a metric identifying a number or a percentage of frames in the copy of the video data determined to have at least a threshold amount of chromatic aberration. The video evaluation device 120 determines 540 multiple metrics identifying frames of the copy of the video data including at least a threshold amount of chromatic aberration.

In various embodiments, the video evaluation device 120 determines additional metrics based on the copy of the video data. For example, the video evaluation device 120 identifies portions of the copy of the video data including a gap in included audio data, as further described above in conjunction with FIG. 2. However, the video evaluation device 120 may determine any suitable additional metrics from the copy of the video data in some embodiments. Further, the video evaluation device 120 may determine fewer or alternative metrics from characteristics of the copy of the video data.

In some embodiments, the video evaluation device 120 exchanges information with other video evaluation devices 120 describing video data received by the different video evaluation devices 120. For example, the video evaluation device 120 receives information from other video evaluation devices 120 and identifies a number of video evaluation devices 120 that are receiving video data having a common characteristic with video data received by the video evaluation device. Particular examples include the video evaluation device 120 identifying a number of video evaluation devices 120 receiving video data from a common channel of a content service provider 150, a number of video evaluation devices 120 receiving video data having a common type or video data corresponding to a common subject. Additionally, different video evaluation devices 120 exchange one or more determined measures that satisfy one or more criteria indicating a problem with the video data, and a video evaluation device 120 identifies a number or a percentage of video evaluation devices 120 receiving video data having a common characteristic, as described above, and determining the measures that satisfy the one or more criteria. This allows a video evaluation device 120 to leverage information from other video evaluation devices 120 to determine a number of video evaluation devices 120 identifying a problem with video data having a common characteristic. The video evaluation device 120 may transmit the determined number or percentage video evaluation devices 120 identifying problems with the video data having the common characteristic to the online system 140 along with information identifying the video data or identifying the common characteristic of the video data.

The video evaluation device 120 transmits 545 the determined measures to the online system 160 via the network 140 along with information identifying the video data. Additionally, the video evaluation device 120 may transmit one or more characteristics extracted from the copy of the video data to the online system 160 along with the determined measure and the information identifying the video data. In some embodiments, the video evaluation device 120 transmits 545 the determined measures to the online system 160 at periodic time intervals. Alternatively, the video evaluation device 120 transmits 545 the determined measures to the online system 160 as the measures are determined. In other embodiments, the video evaluation device 120 transmits 545 the determined measures to the online system 160 when one or more criteria are satisfied. In some embodiments, the video evaluation device 120 also transmits 545 the determines measures to one or more other video evaluation devices 120.

After receiving the determined measures from the video evaluation device 120, the online system 140 combines the determined measures with measures determined by other video evaluation devices 120 and received by the online system 160 to generate 550 one or more aggregated metrics for the video data. In some embodiments, to generate 550 one or more aggregated metrics for the video data, the online system 160 identifies measures received from other video evaluation devices 120 associated with information identifying the same video data as the measures received from the video evaluation device 120 and determines one or more of a mean, a median, a mode, a standard deviation, a variance, and any other suitable statistical measure of the identified measures. Additionally, the online system 160 may combine measures associated with the video data received from multiple video evaluation devices 120 to generate 550 a metric including the measures determined for the video data by different video evaluation devices 120.

As another example, the online system 160 identifies measures determined by other video evaluation devices 120 having one or more common characteristics with the measures determined for the video data by the video evaluation device 120. For example, the online system 160 identifies measures determined by video evaluation devices 120 within a specific time range and associated with a common type of video data. In another example, the online system 160 identifies measures determined by video evaluation devices 120 within a specific time range and associated with a common channel from which video sources 110 obtained the video data. As another example, the online system 160 identifies measures determined by video evaluation devices 120 within a specific time range and associated with a common content provider system 150 from which video sources 110 obtained the video data. Example common characteristics for the video data include a channel that provided the video data, a type of video source providing the video data to the video evaluation device 120, a content provider system 150 providing the video data to video sources 110, a type of communication channel from which the video source 110 received the video data from a content provider system 150. In some embodiments, the online system 160 identifies measures received from other video evaluation devices 120 having the one or more common characteristics with the measures received from the video evaluation device 120 and determines one or more of a mean, a median, a mode, a standard deviation, a variance, and any other suitable statistical measure of the identified measures. Additionally, the online system 160 may combine measures associated with the video data received from multiple video evaluation devices 120 and having one or more common characteristics to generate 550 a metric including the measures determined for the video data by different video evaluation devices 120.

In some embodiments, the online system 160 analyzes the aggregated metrics for video data having one or more common characteristics and identifies one or more potential causes for aggregated metrics that do not satisfy one or more criteria, which may be specified by a content providing system 150 or by the online system 160. For example, the online system 160 transmits a message to a content providing system 150 indicating a potential problem with the network 140 or with a communication channel from the content provider system 150 to the network in response to the online system 160 determining aggregated received metrics for video data from the content providing system 150 and associated with different channels do not satisfy one or more criteria. Alternatively, the online system 160 transmits a message to a content providing system 150 indicating a potential problem with encoding or transmission of a specific channel in response to the online system 160 determining aggregated received metrics for video data from the content providing system 150 and associated with the specific channel do not satisfy one or more criteria, while aggregated retrieved metrics for video data from the content providing system 150 and associated with other channels satisfy the one or more criteria.

The online system 160 applies a model that correlates aggregated metrics for the video data with a performance metric describing user perception of the video data when generating 550 the aggregated metrics in some embodiments. For example, the online system 160 obtains information describing user perception of video data obtained by video sources 110 and presented via display devices 130 during a training interval and one or more of the measures further described above in conjunction with the information describing user perception of the video data determined by video evaluation devices 120 coupled to the video sources 110 and to the display devices 130 which presented the video data. For example, the online system 160 provides surveys to various users to whom different video data obtained by video sources 110 and presented via display devices 130 during the training interval. Responses to the survey comprise the information describing user perception of different video data obtained by video sources 110 and presented via display devices 130 during the training interval. Information describing user perception of video data obtained by video sources 110 and presented via display devices 130 during a training interval and one or more of the measures further described above in conjunction with the information describing user perception of the video data determined by video evaluation devices 120 coupled to the video sources 110 and to the display devices 130 which presented the video data may be obtained by the online system 160 during different intervals, allowing the online system 160 to maintain information describing user perception of video data and measures of the video data at different times. Information describing user perception of video data obtained by video sources 110 and presented via display devices 130 during a training interval is stored by the online system 160 in association with the measures further described above in conjunction with the information describing user perception of the video data determined by video evaluation devices 120 coupled to the video sources 110 and to the display devices 130 which presented the video data, allowing the online system 160 to maintain correlations between user perception of video data and various measures determined for the video data by video evaluation devices 120.

From the information describing user perception of video data presented to users via video sources 110 and display devices 130 during the training interval and the measures determined for the video data presented during the training interval by video evaluation devices 120, the online system 160 generates one or more models correlating a performance metric describing user perception of video data with measures determined for the presented video data by video evaluation devices 120. In some embodiments, the online system 160 generates models for one or more different measures determined for the video data (e.g., blockiness measure, number of frozen frames, number of frames with chromatic aberration) correlating a performance metric describing user perception of video data with different measures determined for the video data.

In some embodiments, the online system 160 applies the generated model to one or more of the measures determined for the video data by the video evaluation device to determine a value for the performance metric indicating a user's perception of the video data. The online system 160 provides the determined value to the performance metric to a content provider system 150 from which the video source 110 received the video data. Additionally or alternatively, the online system 160 applies the generated model to one or more aggregated metrics for the video data, such as the aggregated metrics described above, to generate a value for the performance metric indicating an average perception of the video data by different users to whom the video data was presented. A value for the performance metric determined by the online system 160 may be provided to a content provider system 150 from which the video data was obtained by one or more video sources 110, allowing the content provider system 150 to determine relationships between one or more metrics describing the video data and user perception of the video data. In some embodiments, the online system 160 identifies a time when the video data was displayed by one or more display devices 130 along with the value (or a geographic location where video sources 110 obtaining the video data are located) for the performance metric determined from the model and the one or more aggregated metrics, allowing the content provider system 150 additional information.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An apparatus comprising:
   one or more processors;
   a non-transitory computer readable storage medium coupled to the one or more processors and having instructions encoded thereon that, when executed by a processor, cause the processor to:
   receive video data from a video source;
   generate a copy of the video data that is communicated to an evaluation bus;
   transmit the video data to an output bus for transmission to a display device;
   determine a measure of frozen frames of the copy of the video data in the evaluation bus based on temporal information between consecutive frames of the copy of the video data in the evaluation bus;
   determine a measure of blockiness of frames of the copy of the video data in the evaluation bus, the measure of blockiness of a frame of the copy of the video data in the evaluation bus based on differences between adjacent pixels in the frame of the video data in the evaluation bus;
   determine a measure of chromatic aberration for frames of the copy of the video data in the evaluation bus, the measure of chromatic aberration for the copy of the frame of the video data in the evaluation bus based on a plurality of color histograms extracted from the frame; and
   transmit the measure of frozen frames of the copy of the video data in the evaluation bus, the measure of blockiness of frames of the copy of the video data in the evaluation bus, and the measure of chromatic aberration for frames of the copy of the video data in the evaluation bus to an online system.

2. The apparatus of claim 1, wherein determine the measure of frozen frames of the copy of the video data in the evaluation bus based on temporal information between consecutive frames of the video data in the evaluation bus comprises:
    apply a logical operation to each corresponding location in the frame of the copy of the video data and a consecutive frame of the copy of the video data, the logical operation returning 0 when a value of a pixel at a location in the frame of the copy of the video data is the same as a value of the pixel at the location in the consecutive frame of the copy of the video data and returning 1 when the value of the pixel at the location in the frame of the copy of the video data differs from the value of the pixel at the location in the consecutive frame of the copy of the video data; and
    generate the temporal information between the consecutive frames based on a sum of results from application of the logical operation.

3. The apparatus of claim 2, wherein determine the measure of frozen frames of the copy of the video data in the evaluation bus based on temporal information between consecutive frames of the video data in the evaluation bus further comprises:
    determine the frame and the consecutive frame are candidate frozen frames in response to the temporal information between the consecutive frames is less than a threshold value;
    in response to determining the frame and the consecutive frame are candidate frozen frames:
        identifying an initial frame of the consecutive frames identified as candidate frozen frames;
        apply the logical operation to the frame and to the initial frame of the consecutive frames identified as candidate frozen frames, the logical operation returning 0 when the value of the pixel at the location in the frame is the same as a value of the pixel at the location in the initial frame and returning 1 when the value of the pixel at the location in the frame differs from the value of the pixel at the location in the initial frame data;
    determine additional temporal information based on the sum of application of the logical operation to the frame and to the initial frame of the consecutive frames identified as candidate frozen frames and a number of pixels in the fame; and
    identify the frame and a frozen frame in response to the additional temporal information being less than an additional threshold value.

4. The apparatus of claim 3, wherein the measure of frozen frames of the copy of the video data in the evaluation bus identifies a number of frozen frames identified in the copy of the video data.

5. The apparatus of claim 3, wherein the measure of frozen frames of the copy of the video data in the evaluation bus identifies a percentage of frames in the copy of the video data identified as frozen frames.

6. The apparatus of claim 1, wherein determine the measure of blockiness of frames of the copy of the video data in the evaluation bus comprises:
    determine differences between intensities of horizontally adjacent pixels in the frame;
    determine additional differences between intensities of vertically adjacent pixels in the frame;
    generate a horizontal profile for the frame, each element of the horizontal profile corresponding to a sum of normalized differences between horizontally adjacent pixels within a column of the frame divided by a total number of pixels in the column;
    generate a vertical profile for the frame, each element of the vertical profile corresponding to a sum of normalized differences between vertically adjacent pixels within a row of the frame divided by a total number of pixels in the row;
    apply a discrete Fourier transform to the horizontal profile of the frame;
    determine a horizontal blockiness measure for the frame from the magnitudes of the discrete Fourier transform coefficients for the horizontal profile of the frame;
    apply the discrete Fourier transform to the vertical profile of the frame;
    determine a vertical blockiness measure for the frame from the magnitudes of the discrete Fourier transform coefficients for the vertical profile of the frame; and
    determine a blockiness measure for the frame based on the vertical blockiness measure for the frame and the horizontal blockiness measure for the frame.

7. The apparatus of claim 6, wherein determine a blockiness measure for the frame based on the vertical blockiness measure for the frame and the horizontal blockiness measure for the frame comprises:
    apply different weights to the vertical blockiness measure and to the horizontal blockiness measure; and
    determine the blockiness measure for the frame based on a combination of the weighted vertical blockiness measure and the weighted horizontal blockiness measure.

8. The apparatus of claim 6, wherein the measure of blockiness of frames of the copy of the video data in the evaluation bus identifies a number of frames of the copy of the video data having blockiness measures equaling or exceeding a threshold.

9. The apparatus of claim 6, wherein the measure of blockiness of frames of the copy of the video data in the evaluation bus identifies a percentage of frames of the copy of the video data having blockiness measures equaling or exceeding a threshold.

10. The apparatus of claim 1, wherein determine the measure of chromatic aberration for frames of the copy of the video data in the evaluation bus comprises:
    perform linear regression analysis between each pair of color matrices extracted from the frame;
    sample a specific percentage of pixels from the frame;
    extract plurality of color matrices from the sampled pixels;
    perform linear regression analysis between each pair of color matrices extracted from the sampled pixels; and
    identify the pixel in response to coefficients of the linear regression analysis between each pair of color matrices extracted from the frame and coefficients of the linear regression analysis between each pair of color matrices extracted from the sampled pixels satisfying one or more criteria.

11. The apparatus of claim 10, wherein the measure of chromatic aberration for frames of the copy of the video data in the evaluation bus identifies a number of identified frames from the copy of the video data.

12. The apparatus of claim 10, wherein the measure of chromatic aberration for frames of the copy of the video data in the evaluation bus identifies a percentage of identified frames from the copy of the video data.

13. The apparatus of claim 10, wherein the non-transitory computer readable storage medium coupled to the one or more processors and having instructions encoded thereon that, when executed by the processor, cause the processor to:

determine a measure of frames of the copy of the video data including a gap in audio data included in the copy video data; and transmit the measure of frames of the copy of the video data including the gap in audio data included in the copy video data to the online system.

14. The apparatus of claim 1, wherein the measure of frozen frames of the copy of the video data, the measure of blockiness of frames of the copy of the video data in the evaluation bus, and the measure of chromatic aberration for frames of the copy of the video data in the evaluation bus are determined in parallel.

15. A computer program product comprising a non-transitory computer readable storage medium coupled to the one or more processors and having instructions encoded thereon that, when executed by a processor, cause the processor to:

receive video data from a video source;
generate a copy of the video data;
transmit the video data to a display device;
determine a measure of frozen frames of the copy of the video data based on temporal information between consecutive frames of the copy of the video data;
determine a measure of blockiness of frames of the copy of the video data, the measure of blockiness of a frame of the copy of the video data based on differences between adjacent pixels in the frame of the copy of the video data;
determine a measure of chromatic aberration for frames of the copy of the video data, the measure of chromatic aberration for the copy of the frame of the video data bus based on a plurality of color histograms extracted from the frame; and
transmit the measure of frozen frames of the copy of the video data, the measure of blockiness of frames of the copy of the video data, and the measure of chromatic aberration for frames of the copy of the video data to an online system.

16. The computer program product of claim 15, wherein determine the measure of frozen frames of the copy of the video data comprises:

apply a logical operation to each corresponding location in the frame of the copy of the video data and a consecutive frame of the copy of the video data, the logical operation returning 0 when a value of a pixel at a location in the frame of the copy of the video data is the same as a value of the pixel at the location in the consecutive frame of the copy of the video data and returning 1 when the value of the pixel at the location in the frame of the copy of the video data differs from the value of the pixel at the location in the consecutive frame of the copy of the video data; and
generate the temporal information between the consecutive frames based on a sum of results from application of the logical operation.

17. The computer program product of claim 16, wherein determine the measure of frozen frames of the copy of the video data in the evaluation bus based on temporal information between consecutive frames of the copy of the video data comprises:

determine the frame and the consecutive frame are candidate frozen frames in response to the temporal information between the consecutive frames is less than a threshold value;
in response to determining the frame and the consecutive frame are candidate frozen frames:

identifying an initial frame of the consecutive frames identified as candidate frozen frames;
apply the logical operation to the frame and to the initial frame of the consecutive frames identified as candidate frozen frames, the logical operation returning 0 when the value of the pixel at the location in the frame is the same as a value of the pixel at the location in the initial frame and returning 1 when the value of the pixel at the location in the frame differs from the value of the pixel at the location in the initial frame data;
determine additional temporal information based on the sum of application of the logical operation to the frame and to the initial frame of the consecutive frames identified as candidate frozen frames and a number of pixels in the fame; and
identify the frame and a frozen frame in response to the additional temporal information being less than an additional threshold value.

18. The computer program product of claim 17, wherein the measure of frozen frames of the copy of the video data identifies a number of frozen frames identified in the copy of the video data.

19. The computer program product of claim 15, wherein determine the measure of blockiness of frames of the copy of the video data comprises:

determine differences between intensities of horizontally adjacent pixels in the frame;
determine additional differences between intensities of vertically adjacent pixels in the frame;
generate a horizontal profile for the frame, each element of the horizontal profile corresponding to a sum of normalized differences between horizontally adjacent pixels within a column of the frame divided by a total number of pixels in the column;
generate a vertical profile for the frame, each element of the vertical profile corresponding to a sum of normalized differences between vertically adjacent pixels within a row of the frame divided by a total number of pixels in the row;
apply a discrete Fourier transform to the horizontal profile of the frame;
determine a horizontal blockiness measure for the frame from the magnitudes of the discrete Fourier transform coefficients for the horizontal profile of the frame;
apply the discrete Fourier transform to the vertical profile of the frame;
determine a vertical blockiness measure for the frame from the magnitudes of the discrete Fourier transform coefficients for the vertical profile of the frame; and
determine a blockiness measure for the frame based on the vertical blockiness measure for the frame and the horizontal blockiness measure for the frame.

20. The computer program product of claim 19, wherein the measure of blockiness of frames of the copy of the video data identifies a number of frames of the copy of the video data having blockiness measures equaling or exceeding a threshold.

21. The computer program product of claim 15, wherein determine the measure of chromatic aberration for frames of the copy of the video data comprises:

perform linear regression analysis between each pair of color matrices extracted from the frame;
sample a specific percentage of pixels from the frame;
extract plurality of color matrices from the sampled pixels;

perform linear regression analysis between each pair of color matrices extracted from the sampled pixels; and identify the pixel in response to coefficients of the linear regression analysis between each pair of color matrices extracted from the frame and coefficients of the linear regression analysis between each pair of color matrices extracted from the sampled pixels satisfying one or more criteria.

22. The computer program product of claim 21, wherein the measure of chromatic aberration for frames of the copy of the video data identifies a number of identified frames from the copy of the video data.

* * * * *